United States Patent

Bailey

[15] 3,666,847
[45] May 30, 1972

[54] METHOD AND APPARATUS FOR CONTROLLING ORIENTATION OF NEEDLE-LIKE CARBON PARTICLES IN EXTRUDED CARBONACEOUS STOCK

[72] Inventor: Bruce L. Bailey, Lewiston, N.Y.
[73] Assignee: Great Lakes Carbon Corporation, New York, N.Y.
[22] Filed: Nov. 7, 1969
[21] Appl. No.: 874,848

[52] U.S. Cl..............................264/29, 18/14 V, 23/209.2, 25/11, 25/15, 25/17, 264/105, 264/108
[51] Int. Cl........................................B29f 3/04, C04b 35/54
[58] Field of Search...................................264/29, 105, 108; 25/11–17; 23/209.2; 18/14 R, 14 V

[56] References Cited

UNITED STATES PATENTS

| | | | |
|---|---|---|---|
| 2,280,022 | 4/1942 | Banigan et al. | 264/108 |
| 2,332,829 | 10/1943 | Parsons et al. | 264/108 |
| 3,068,515 | 12/1962 | Thomas | 25/17 |
| 3,284,372 | 11/1966 | Bailey | 264/105 |
| 3,350,485 | 10/1967 | Shesler et al. | 264/105 |
| 3,196,486 | 7/1965 | Shesler et al. | 264/176 |
| 1,700,208 | 1/1929 | Paisseau | 264/108 |

OTHER PUBLICATIONS

" Research and Development on Advanced Graphite Materials" Volume XLII, Summary Technical Report, WADD TR 61- 72, Wright-Patterson Air Force Base, Ohio, August 1963 at 76 and 167- 173.

Primary Examiner—Julius Frome
Assistant Examiner—John H. Miller
Attorney—Wallace F. Neyerlin

[57] ABSTRACT

A means and method are provided for extruding compositions, particularly for extruding mixes of carbon and/or graphite particles and carbonizable binder. The means and method can additionally be employed to control the orientation of acicular particles in a composition during the extrusion thereof so as to control the properties of the extruded product.

In all cases, the extrusion die's internal configuration is defined by at least three sections comprising first a converging section, then a diverging section and then a final section of substantially constant cross-section. A section of substantially constant cross-section may also sometimes follow the converging section.

When employed in the extrusion of a carbonaceous mix containing needle-like carbon particles, dies of the present invention of appropriate design can be used to produce stock which after baking and graphitizing is characterized by having a transverse to longitudinal average coefficient of thermal expansion (CTE) ratio considerably less than that characteristic of corresponding stock in which the particles are all axially aligned.

12 Claims, 2 Drawing Figures

Patented May 30, 1972

INVENTOR.
BRUCE L. BAILEY

METHOD AND APPARATUS FOR CONTROLLING ORIENTATION OF NEEDLE-LIKE CARBON PARTICLES IN EXTRUDED CARBONACEOUS STOCK

BACKGROUND OF THE INVENTION

1. Field of the Invention

This invention relates broadly to a method and apparatus for controlling the orientation of acicular particles in an extrudable material or composition so as to control the properties of the extruded product. The invention more particularly relates to the production and manufacture of carbon and graphite products and to a special means or apparatus particularly useful in carrying out one of the steps of said production and manufacture, viz. the extrusion step.

2. Description of the Prior Art

In the conventional or normal type of extrusion of green carbon bodies such as electrodes from a mixture of carbon and/or graphite particles and a binder, such as pitch, the mix is subjected to essentially continuous reduction in a converging die or die system connected directly to the mud cylinder of the press. In the production of certain graphite electrodes for steel furnaces, and other graphite products, such as anodes for brine electrolysis and graphite for nuclear reactors, a high percentage of the carbon and/or graphite particles employed in the mixture are frequently acicular or needle-like in shape. When extruding in a conventional die system, the reduction ratio, that is, the ratio of the cross-sectional area of the mud chamber to the cross-sectional area of the product to be extruded is frequently so great that virtually all of the needle-like particles end up aligned with their axes parallel to that of the product. This leads to a graphite product which has a relatively high coefficient of thermal expansion (CTE) in the direction(s) perpendicular to, as compared to parallel with, the direction of extrusion and consequently to a graphite product which may not give optimum performance in the particular environment in which the graphite product is to be used, for example graphite electrodes in service on a modern ultra-high-powered electric steel furnace where the thermal shock and thermal stress conditions are particularly severe.

To control the alignment or orientation of needle-like particles to the degree that is required or desired in the final graphite electrode when using a conventional batch type extrusion press coupled with a single converging die, the degree of reduction during extrusion, or, in other words, the ratio of the cross-sectional area of the mud cylinder of the press to the cross-sectional area of the product would have to be so small that, particularly in the case of large-diameter electrodes, only one plus a small-fraction electrode could be extruded from a given charge to the press. This would mean that the extrusion operation would have to be interrupted much more frequently than when employing a converging die with a high degree of reduction and that at least every other electrode extruded would contain a so-called batch interface generated by the mating of two successive batches or charges to the press. Such interfaces have frequently caused problems in processing, especially when the degree of reduction through extrusion is small, since they tend to persist throughout subsequent processing and represent potential regions of weakness or stress concentration.

A conventional extrusion press with a large mud cylinder, because of its large cross-sectional area as compared to the cross-sectional area of the electrode to be extruded, permits the extrusion of more than one electrode from a given charge and thus minimizes problems connected with batch interfaces between charges. This, however, suffers the disadvantage of restricting the degree of freedom over the control of the grain orientation in the extruded product since a high degree of reduction leads to substantially complete or axial alignment of the particles.

Also, many conventional presses are of the tilting type and have an associated vertical tamping apparatus. A tamping pressure higher than the extrusion pressure is beneficial in the attainment of a high density in the final product. In such cases, a separate mechanism is required for high pressure tamping in order to confine the mix, otherwise, the tamping is limited to the normal extrusion pressure of the single die system, since, if this pressure is exceeded when the press cylinder is in the vertical position required for charging and tamping, the material would begin to extrude.

Previous attempts have been made to devise extrusion methods and apparatuses which will accomplish some of the goals and objectives of the present invention such as controlling the transverse to parallel or longitudinal (T/L) ratio of the CTE of the bodies produced, and U. S. Pat. No. 3,350,485 is illustrative of one type of such approach or development. Appendix VI (pages 167-172) of "Technical Documentary Report No. WADD TR61-72, Vol. XLII" describes another related development. However, the techniques and solutions devised in these references are substantially different from the methods and apparatuses devised and employed in the present invention.

SUMMARY OF THE INVENTION

An object of the present invention is to provide a means and method for controlling the orientation of acicular particles in a composition during the extrusion thereof so as to control the properties of the extruded product.

A further and more specific object of this invention is to provide a means and method for controlling the orientation of the coke and/or graphite particles and binder in a carbonaceous mix during extrusion so as to effect the desired properties in the final product, particularly the thermal expansion properties. This latter objective of the present invention is especially applicable to the processing of coke and/or graphite particles of high quality, i.e., to particles a high percentage of which contain or possess a needle-like structure.

Another object is to accomplish the foregoing while still employing a conventional capacity mud chamber and also, if desired, while still employing a tilting type press and associated tamping apparatus.

It is a finding of this invention that when processing such a carbonaceous mix containing needle-like coke and/or graphite particles and a carbonizable binder in a generally longitudinal direction through a forming die of the present invention, the alignment of the particles can be substantially altered such that the ratio of the transverse to the longitudinal average coefficient of thermal expansion of the extruded stock, after baking and graphitizing, is reduced from that characteristic of axial alignment. Graphite bodies with such reduced (T/L) CTE ratios or controlled thermal expansion properties may be advantageous for nuclear reactor applications, for reasons discussed in the aforesaid U. S. Pat. No. 3,350,485; they may also be advantageous when used as thermic electrodes in electric steel furnaces and in other applications.

It is an additional finding of the present invention that carbonaceous stock of generally improved structure and typically of higher strength, stemming primarily from the higher pressures that can be used in extruding the mix, can be produced when using process techniques and apparatus within the broad scope of the present invention, even when little or none of the coke and/or graphite particles employed in the mix being processed is of the "needle-like" type.

The dies employed to accomplish any of the aforedescribed goals of the present invention are all characterized by possessing at least three sections (which sections are also preferably coaxially aligned) comprising first a converging section, then a diverging section and then a final section of substantially constant cross-section. A section of substantially constant cross-section may also sometimes follow the converging section. In the production of cylindrical products, the sections are each also preferably characterized by possessing smooth interior contours and are also so shaped and designed that a cross-section at any location in each of the sections is circular. (As will be discussed hereinafter, however, the stock being extruded need not always possess such a circular cross-section at any location.) As previously indicated, there may also be a region or section of substantially constant cross-section (e.g., a substantially cylindrical section) located after the converging section although this requirement will depend upon the particular die contour within each section and also the particular specific goal being sought at the time.

The dimensions and contours of the sections of the die are so regulated as to develop the desired improved structure and physical properties. When the mix employed involves particles of the "needle-like" type, these particles are substantially aligned with their axes parallel to the axis of the extrusion cylinder upon exiting from the converging section, which is attached directly to the straight cylindrical barrel or mud pot of the extrusion press. From this section, the material enters the diverging portion or expansion section of the die system where the individual grains or needle-like particles are forced to take a position such that their axes tend to become oriented in a plane that is at an angle to or perpendicular to the axis or direction of extrusion, depending upon the amount of divergence. The material then moves into the section of substantially constant cross-section where the orientation of the grains or needle-like particles effected in the diverging section becomes fixed, so that on the average the angle of inclination that the axes of these needle-like particles make with the axis of extrusion is such that the desired CTE characteristics in the final product are achieved.

As will become clearer from a consideration of the Examples which follow, the amount of change in the CTE characteristics in the final product is dependent upon the ratio of the cross-sectional area of the final section to the minimum cross-sectional area of the converging section. This ratio is preferably at least 1.2 to 1 in order to effect significant realignment of the particles. The transverse CTE is largest when the ratio of the cross-section al area of the final section to the minimum area of the converging section is the smallest. An isotropic (T and L CTEs substantially the same) carbon body is typically achieved when the cross-sectional area of the final section is about 2½ times the minimum area of the converging section (2.5 to 1). As the ratio of the cross-sectional area of the final section to the minimum area of the converging section is increased beyond the foregoing 2.5 to 1 ratio, the T CTE becomes smaller so that the T/L ratio also becomes smaller. The production of carbon and graphite bodies possessing such reduced T/L CTE ratios are desirable for certain specific applications just as are bodies which are substantially isotropic.

The contours of the internal surfaces of the converging or diverging sections of the die system are variable but generally consist of smooth surfaces, continuously decreasing or increasing gradually, depending upon whether the converging or diverging section is involved. Most frequently the cross-sectional shape of the material being extruded at any given location will be circular. However, in some cases it may be desirable that the converging and/or diverging sections possess or define other geometrical configurations, such as to define rectangular, hexagonal or annular cross-sectional shapes.

The over-all length of the die system is limited mainly by practical considerations. Since the structural integrity of the material exiting from the die system is preserved mainly by the frictional forces acting on its surface, the length ($L_3$) of the section of substantially constant cross-section should be such as to exert the desired frictional force. The preferred length ($L_3$) should not be less than twice the diameter ($D_3$) and more preferably, 3 or 4 times the diameter so as to insure that the frictional forces provided by section C are sufficient to provide enough restraint to let the mix being extruded fully fill the final section. The length ($L_2$) and design of the diverging section are matched to and/or correlated with the diameter and length of the final section. The design of the diverging section and the rate at which the material being extruded is forced or passes therethrough should also be such that the material exiting from the converging section does not "rifle" or "shotgun" through this expansion section thereby negating its function.

No baffle plates nor any other types of obstruction are placed within the die system, except perhaps a mandrel in case a material of annular cross-section is to be extruded, and the control of the alignment of the particles (and consequently the achievement of the desired properties) are attained substantially entirely by means of the forces applied to the mix by the internal configuration of the die system employed and of the various sections thereof.

BRIEF DESCRIPTION OF THE DRAWINGS

A representative die of preferred construction is show in cross-section in FIG. 1. This figure also shows the internal contours of the various essential sections of the die, as well as auxiliary apparatus used with the die.

FIG. 2, however, is a schematic rather than a cross-sectional view.

DETAILED DESCRIPTION OF THE DRAWINGS & OF THE PREFERRED EMBODIMENTS

Figure 1:
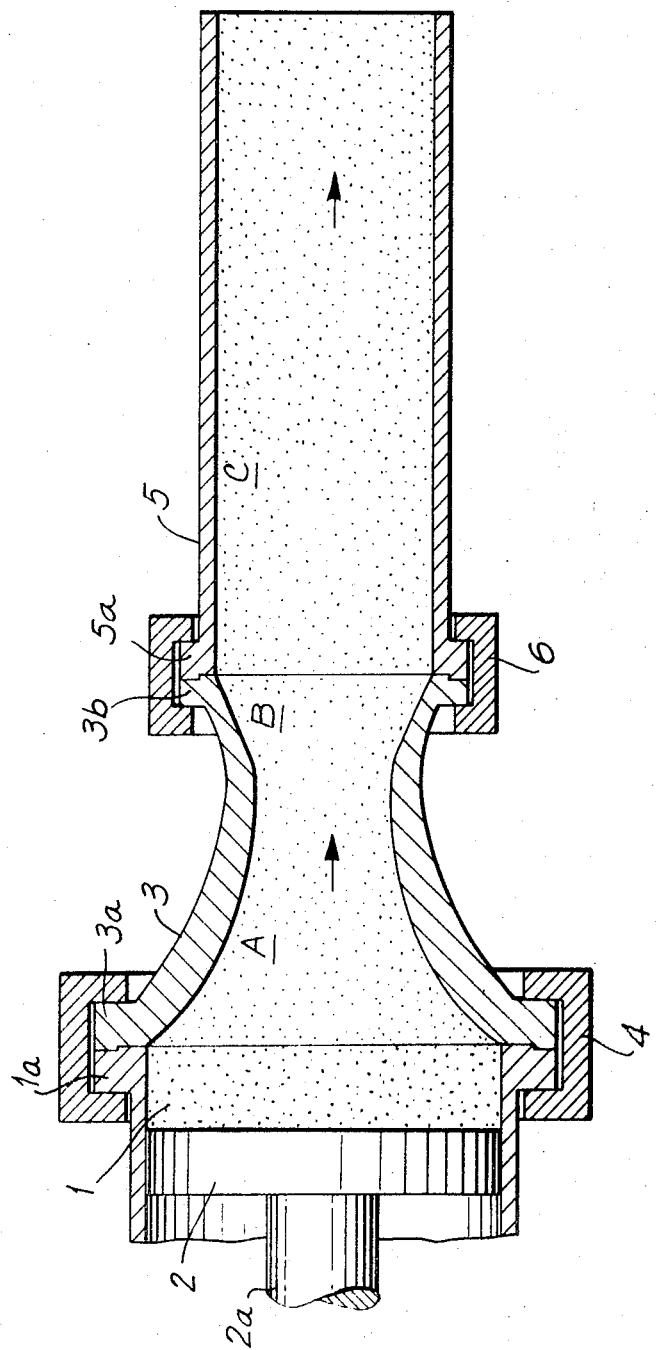

In FIG. 1 the converging section is shown at A, the diverging or expansion section at B, and the section of substantially constant cross-section at C. It will be noted that in section A, the die contour is continuously diminishing and that the cross-section at any point along its length defines a circle (although the cross-sectional area is changing). The same feature applies also to section B, except that in section B, the contour is frusto-conical and there is gradual expansion instead of reduction.

It should be noted that the sections described as A, B and C refer more to the contours of the die sections rather than the physical parts of the die system, these latter now being described in connection with the reference numerals of the drawing.

The mix to be extruded is charged into a cylindrical chamber of "mud cylinder" 1 of a conventional hydraulic or mechanical press. The mix is forced through section A by advancing ramhead 2, which is connected to the mechanically or hydraulically actuated ram 2a. (Such a means for forcing the mix into the die sections of the extrusion dies of the present invention is greatly preferred over other means, such as a screw-type extruder.) It will be appreciated that, as illustrated, only a portion of the mud cylinder is shown and that ram 2a and ramhead 2 have neared the end of their stroke in the direction toward converging section A. The press terminates in a flange 1a which is coupled with flange 3a of member 3 (which defines converging section A and also diverging section B) by means of ring clamp 4. Flange 3b of member 3 is coupled to flange 5a at the inlet end of member 5, (which defines section C) by means of ring clamp 6. Section C is of substantially constant cross-sectional area, e.g., cylindrical.

It should, of course, be appreciated that the manner in which the sections are joined together in FIG. 1 may be varied, as may also the number of members and clamps employed in order to obtain the desired configuration of the entire assembly, the particular way the members are joined and shown in FIG. 1 being illustrative only.

Figure 2:
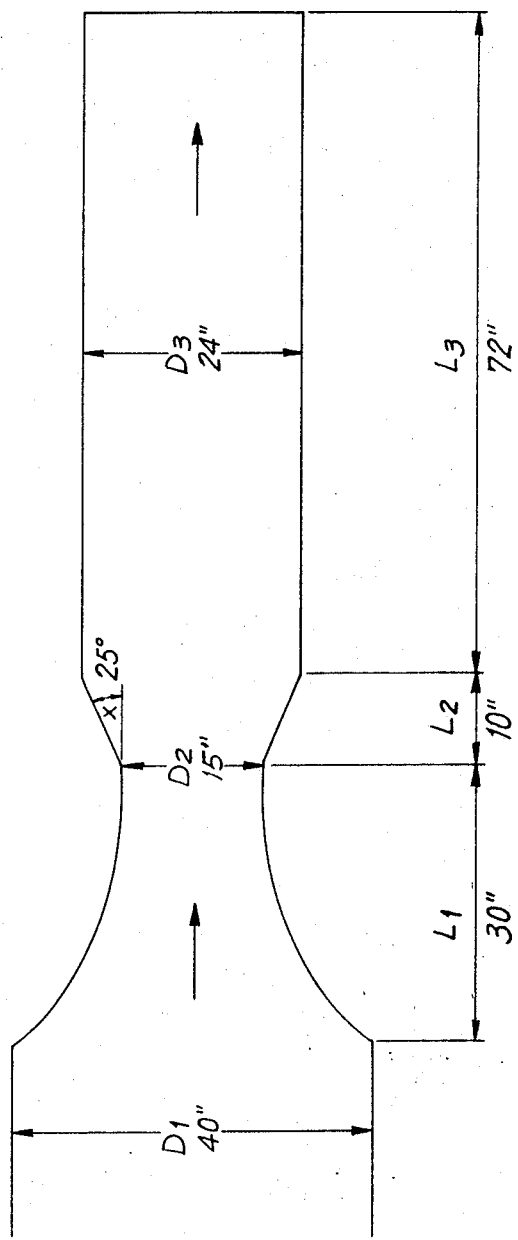
FIG. 2 also shows section contours, similar to those shown in FIG. 1, of dies embraced within the invention.

The internal configuration of the die shown in cross-section in FIG. 1 is repeated schematically in FIG. 2 so as to further and more completely illustrate dimensions and angles and curves being discussed, which are considered representative of the present invention.

The die of FIGS. 1 and 2 is employed in the production of a cylindrical graphite product with a diameter of 24 inches. The "mud cylinder" has a diameter of 40 inches, (diameter $D_1$). In passing through section A, which possesses a length $L_1$ of about 30 inches, the stock is gradually reduced to a diameter of about 15 inches ($D_2$). The cross-sectional area reduction ratio of this particular die, therefore is about 7 to 1. A reduction ratio no higher than about 15.0 to 1 is normally employed in the converging section. Diverging section B has an average angle of divergence of about 25° (angle $x$) with respect to the axis of the die, and the stock being extruded therethrough changes from a diameter of about 15 inches at its inlet to a maximum of about 24 inches ($D_3$) (a cross-sectional area expansion ratio of about 1 to 2.6), over its length $L_2$ of about 10 inches. (Angle $x$ will generally be between about 15° and about 45°.) The maximum diameter of 24 inches is maintained for a distance $L_3$ of about 72 inches in section C which is of substantially constant cross-section, e.g., cylindrically shaped member 5 (FIG. 1). It will also be noted that in this particular die design or system the cross-sectional area reduction ratio in the converging section is about 2.7 times the expansion ratio of the cross-sectional areas of the stock entering and leaving the diverging section.

It should also be noted that the cross-sectional area of the stock leaving this particular die is about 2.55 times the cross-sectional area of the stock when it reaches its minimum dimensions in the converging section. As will be clear from Example 2 of the Table which follows, such a relationship is necessary in the dies of the present invention which are specifically designed for the processing of a carbonaceous mix containing needle-like particles and wherein it is desired to alter the alignment of said particles to such an extent that the ratio of the transverse to the longitudinal average coefficient of thermal expansion of the stock, after baking and graphitizing, is reduced, from that characteristic of axial alignment, to approximate unity.

Another die system embraced within the present invention, and one which is particularly advantageous for the production of large diameter stock without having to resort to larger mud cylinder and extrusion presses, is one wherein the maximum diameter of the stock leaving the diverging section exceeds its diameter in the mud cylinder 1. For example, the die system may possess an inlet 40 inches in diameter and the diameter of the stock may be caused to change from 40 inches ($D_1$) to 15 inches ($D_2$) in converging section A (a cross-sectional area reduction ratio of about 7.3 to 1), and finally to 50 inches ($D_3$) in passing through diverging section B (a cross-sectional area expansion ratio of about 1.0 to 11.1, whereafter its diameter remains constant in passing through section C.

In this die system, the average angle of convergence in section A is the same as that of section A of FIGS. 1 and 2, unless length $L_1$ is greatly reduced. The diverging angle ($x$) employed in section B may be substantially identical to that of FIGS. 1 and 2,, but this will depend upon and be related to the dimension $L_2$ of the die in effecting the diameter change indicated, i.e., from 15 inches to 50 inches.

In this embodiment of the invention it will also be noted that the final diameter $D_3$ of the stock (50 inches) exceeds the diameter $D_1$ (40 inches) of the stock entering the converging section. As shown by the results of Example 2A in the Table which follows, a die of such a particular configuration, i.e., one with a very high ratio between the area of the final section to the minimum area of the converging section, is used to effect a greater reorientation of the needle-like particles. This is indicated by the lower T CTE and higher L CTE shown in Example 2A as compared to the corresponding values in Examples 2 and 4.

Other die systems and configurations may also be employed in carrying out the present invention and in achieving various objectives thereof. The foregoing described die systems, therefore, are not intended to be limitative but rather to be illustrative only of the die configurations and dimensions which may be used in the present invention.

In most instances, the minimum cross-sectional area of the stock emerging from the section of substantially constant cross-section will be at least 6 square inches. Extruded stock, e.g., carbonaceous, between about 90 and about 3,000 square inches in cross-sectional area is typical of the products produced in the present invention.

Properties of graphitized products which have been extruded through "converging-diverging" dies of the present invention compared to graphitized products or "controls" which have been conventionally extruded (i.e., using a "Standard" single converging section) are set forth in the following Table. In the Examples of the Table, the carbon aggregate consisted of 45 parts of particles, ranging in Tyler screen size from through 3 mesh to just under 20 mesh, and 55 parts of flour milled to a fineness of 55 percent through 200 mesh. In each of the Examples, the carbon aggregate was mixed with the indicated number of parts of binder (coal tar pitch) having a softening point of about 110° C, and was extruded at the indicated pressure. (Other carbonizable binders which may be used in the present invention include resins, tars, petroleum pitches and residues. Mixtures of binders may also be used.) The extruded products were then baked and graphitized (to about 2,600° C) under identical conditions conventional in the art.

TABLE

| Example | 1 | 2 | 2A | 3 | 4 |
|---|---|---|---|---|---|
| Die | Standard | Converging-diverging | Converging-diverging | Standard | Converging-diverging |
| Dimensions (inches) of $D_1$-$D_2$-$D_3$ | $D_1$-$D_2$ 40-24 | $D_1$-$D_2$-$D_3$ 40-15-24 | $D_1$-$D_2$-$D_3$ 40-15-50 | $D_1$-$D_2$ 40-20 | $D_1$-$D_2$-$D_3$ 40-15-20 |
| Cross-sectional area ratios | $D_1^2/D_2^2$ 2.78 | $D_1^2/D_2^2$-$D_3^2/D_2^2$ 7.1-2.55 | $D_1^2/D_2^2$-$D_3^2/D_2^2$ 7.1-11.1 | $D_1^2/D_2^2$ 4 | $D_1^2/D_2^2$-$D_3^2/D_2^2$ 7.1-1.78 |
| Type coke | Needle A | Needle A | Needle A | Needle B | Needle B |
| Binder level (pts./100 pts. coke) | 25.6 | 25.6 | 25.6 | 27.4 | 27.4 |
| Extrusion pressure (p.s.i.) | 1,600 | 1,700 | 1,700 | 1,600 | 1,800 |
| Properties of graphite: | | | | | |
| Apparent density (g./ml.) | 1.61 | 1.61 | 1.61 | 1.58 | 1.58 |
| Electrical resistivity (lengthwise) (ohm-in.×10⁵) | 27 | 35 | 42 | 31 | 37 |
| CTE ° C.⁻¹ (20-100° C.): | | | | | |
| L×10⁷ | 8.0 | 13.0 | 17.0 | 7.1 | 10.0 |
| T×10⁷ | 18.1 | 13.5 | 8.0 | 17.7 | 14.0 |
| Ratio T/L | 2.26 | 1.04 | 0.47 | 2.5 | 1.4 |
| Flexural strength (p.s.i.): | | | | | |
| L | 890 | 850 | 730 | 990 | 870 |
| T | 740 | 830 | 900 | 750 | 800 |

It will be noted that the dies of the present invention (Examples 2, 2A and 4) lessened the alignment of the particles so that the ratio of the transverse to the longitudinal average coefficient of thermal expansion (T/L ratio) of the stock, after baking and graphitizing, was reduced from that characteristic of axial alignment (viz. from that which resulted when a "Standard" extrusion die was used, as in Examples 1 and 3).

The die system of this invention is operated in much the same manner as that employed by those skilled in the art in extruding through conventional dies. As previously pointed out, however, caution must be observed to adjust conditions so that the material in the system flows smoothly and does not shot-gun or rifle through the expansion section. Extra care must also be observed in closely controlling those operating variables that affect the rheological characteristics of the mix in order to assure an axially symmetrical pattern of flow through the system as successive batches are charged to the system. A multiplicity of separately controlled heating coils may be employed to surround the various sections of the die to assist in this control.

The mix is charged to the mud chamber of the press and is consolidated by advancing the ram until the die system is filled. (To start with it is necessary to block off the exit end in order to completely fill the expansion portion of the die system.) Once the die is filled the extrusion can be conducted in the usual manner.

As previously indicated, when using a mix composed of needle-like particles and a coal tar pitch binder, and dies with design features as previously described, the particles tend to be oriented in the mud chamber of the press with their long axes perpendicular to the axis of the cylinder or direction of motion. As the mix progresses through the converging section, the needle-like particles become aligned with their long axes mutually parallel and parallel with the axis of the die. Then as the mix progresses into the diverging section, the needle-like particles tend to become realigned with their axes generally inclined at some angle with respect to the axis of the die system depending upon the amount of divergence. Finally the mix progresses through the final section of substantially constant cross-section, where little or no further reorientation of the particles occurs.

Essentially then, one of the main purposes of the dies embraced within the present invention is to permit the control of grain orientation during extrusion as a means of controlling the coefficient of thermal expansion (CTE) characteristics in the final graphite product. It should be emphasized that the level or magnitude of the electrode CTE will be dependent upon the CTE characteristics of the raw material, and that the ratio of the transverse to the longitudinal CTE will be dependent not only on the raw material but also on the specific dimension of the various sections of the die system.

It should also be appreciated, of course, that the dies of the present invention can also be used for achieving the use of increased extrusion pressures and/or the production of larger cross-sectional area stock than that of any particularly sized mud cylinder that might be on hand and that for such purpose(s) the dies can also be used with non-needle-like particle mixes.

I claim:

1. A method for controlling the thermal expansion properties of carbonaceous stock having a minimum cross-sectional area of at least 6 square inches comprising the step of forcing, by means of a conventional hydraulically or mechanically actuated ram press, a carbonaceous mix containing needle-like coke particles or needle-like graphite particles or mixtures thereof and a carbonizable binder through a forming die which is free from any obstructions and which possesses at least three sections defined by the walls of the die comprising first a converging section, then a gradually diverging section possessing no abrupt contour changes, and then a final section of substantially constant cross section, but whose length is not less than twice its diameter, the cross-sectional area of the final section also being at least 1.2 times the minimum cross-sectional area of the converging section, whereby the alignment of said particles is altered to such an extent that the ratio of the transverse to the longitudinal average coefficient of thermal expansion of said stock after baking and graphitizing is reduced from that characteristic of axial alignment.

2. A method according to claim 1 wherein the sections of said forming die are coaxially aligned.

3. A method according to claim 1 wherein the average angle of divergence in the diverging section is between about 15° and about 45° with respect to the axis of the die.

4. A method according to claim 1 wherein said converging section is followed by a section of substantially constant cross-section before the diverging section.

5. A method according to claim 1 wherein the cross-section of the mix being extruded at any location in each of the sections is circular.

6. A method according to claim 1 wherein the cross-sectional area of the final section of the forming die is about 2½ times the minimum cross-sectional area of the converging section.

7. An apparatus for extruding comprising a cylindrical chamber into which the material to be extruded is charged, a conventional hydraulically or mechanically actuated ram press for forcing the extrudable material through the apparatus, and a forming die leading from the outlet of the cylindrical chamber, said forming die being characterized by being free from any obstructions and by possessing at least three sections defined by the walls of the die comprising first a converging section, then a gradually diverging section possessing no abrupt contour changes, and then a final section of substantially constant cross-section, but whose length is not less than twice its diameter.

8. An apparatus according to claim 7 wherein the sections of said forming die are coaxially aligned.

9. An apparatus according to claim 7 wherein said converging section of the forming die is followed by a section of substantially constant cross-section before the diverging section.

10. An apparatus according to claim 8 wherein said coaxially aligned sections of the forming die are each also characterized by possessing smooth interior contours and wherein a cross-section at any location in each of the sections is circular.

11. An apparatus according to claim 7 wherein the cross-sectional area of the final section of the forming die is at least 1.2 times the minimum cross-sectional area of the converging section.

12. An apparatus according to claim 11 wherein the cross-sectional area of the final section of the forming die is about 2½ times the minimum cross-sectional area of the converging section.

* * * * *